United States Patent
Yatsumonji et al.

(10) Patent No.: US 10,717,809 B2
(45) Date of Patent: Jul. 21, 2020

(54) PRODUCTION METHOD OF POLYMER COMPOUND

(71) Applicant: Sumitomo Chemical Company, Limited, Tokyo (JP)

(72) Inventors: Yasutaka Yatsumonji, Oita (JP); Haruki Otsuka, Niihama (JP); Ayuko Miura, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 16/311,204

(22) PCT Filed: Jul. 13, 2017

(86) PCT No.: PCT/JP2017/025538
§ 371 (c)(1),
(2) Date: Dec. 19, 2018

(87) PCT Pub. No.: WO2018/016414
PCT Pub. Date: Jan. 25, 2018

(65) Prior Publication Data
US 2019/0185613 A1 Jun. 20, 2019

(30) Foreign Application Priority Data
Jul. 22, 2016 (JP) ................ 2016-144151

(51) Int. Cl.
*C08G 61/12* (2006.01)
*B01J 31/24* (2006.01)

(52) U.S. Cl.
CPC .......... *C08G 61/12* (2013.01); *B01J 31/2404* (2013.01); *B01J 2531/824* (2013.01);
(Continued)

(58) Field of Classification Search
CPC . C08G 61/12; C08G 2261/411; B01J 31/2404
See application file for complete search history.

(56) References Cited

U.S. PATENT DOCUMENTS

2003/0154647 A1 8/2003 Nguyen et al.
2009/0036623 A1* 2/2009 Tsuda ............. C08G 61/00
526/242

(Continued)

FOREIGN PATENT DOCUMENTS

JP 2007126652 A 5/2007
JP 2008189759 A 8/2008
(Continued)

OTHER PUBLICATIONS

Amy B. Pangborn et al., "Safe and Convenient Procedure for Solvent Purification," 15 Organometallics 1518 (1996).*
(Continued)

*Primary Examiner* — Nicholas E Hill
(74) *Attorney, Agent, or Firm* — Panitch Schwarze Belisario & Nadel LLP

(57) ABSTRACT

The invention provides a production method of a polymer compound having a constitutional unit represented by the formula (3-1) and a constitutional unit represented by the formula (3-2), which contains a step of reacting a compound represented by the formula (1) and a compound represented by the formula (2) in the presence of a transition metal complex, a base and an organic solvent having a peroxide amount of 15 ppm by weight or less:

$$X^1-Ar^1-X^1 \quad (1)$$

$$X^2-Ar^2-X^2 \quad (2)$$

$$-(Ar^1)- \quad (3\text{-}1)$$

(Continued)

-continued $$-(Ar^2)-\quad (3\text{-}2)$$

wherein $Ar^1$ and $Ar^2$ represent a divalent aromatic hydrocarbon group, a divalent heteroaromatic group, a group represented by the formula (4) or the like; $X^1$ represents a bromine atom or the like; $X^2$ represents $-B(OH)_2$, a borane residue, a borate ester residue or the like;

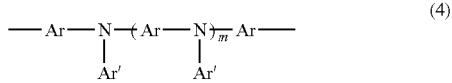

(4)

wherein Ar represents a divalent aromatic hydrocarbon group, a divalent heteroaromatic group or the like, Ar' represents an aryl group or a monovalent heteroaromatic group, m represents an integer of 0-2.

3 Claims, 1 Drawing Sheet

(52) U.S. Cl.
CPC ... *C08G 2261/148* (2013.01); *C08G 2261/32* (2013.01); *C08G 2261/334* (2013.01); *C08G 2261/3324* (2013.01); *C08G 2261/411* (2013.01)

(56) References Cited

U.S. PATENT DOCUMENTS

| | | |
|---|---|---|
| 2010/0090206 A1 | 4/2010 | Nakatani et al. |
| 2010/0176376 A1 | 7/2010 | Suzuki et al. |
| 2012/0313052 A1 | 12/2012 | Yoshida et al. |
| 2014/0252332 A1 | 9/2014 | Carroll |

FOREIGN PATENT DOCUMENTS

| | | | |
|---|---|---|---|
| JP | 2011195828 A | | 10/2011 |
| JP | 2012214704 A | | 11/2012 |
| JP | 2013159728 A | | 8/2013 |
| JP | 2013237789 A | | 11/2013 |
| JP | 2013256655 A | | 12/2013 |
| JP | 2014529179 A | | 10/2014 |
| JP | 2015063662 A | * | 4/2015 |

OTHER PUBLICATIONS

D. Bradley G. Williams & Michelle Lawton, "Drying of Organic Solvents: Quantitative Evaluation of the Efficiency of Several Desiccants," 75 Journal of Organic Chemistry 8351 (2010).*
English-language machine translation of JP-2015063662-A, performed on Espacenet on Dec. 6, 2019.*
Cook et al., "High brightness deep blue/violet fluorescent polymer light-emitting diodes (PLEDs)," J. Mater. Chem. C., vol. 3, pp. 9664-9669 (2015).
International Preliminary Report on Patentability dated Jan. 22, 2019 in International Application No. PCT/JP2017/025538.
International Search Report dated Oct. 10, 2017 in International Application No. PCT/JP2017/025538.
Chen et al., "Pure and Saturated Red Electroluminescent Polyfluorenes with Dopant/Host System and PLED Efficiency/Color Purity Trade-Offs," Advanced Functional Materials, vol. 20, No. 18, pp. 3143-3153 (2010).
De Francisco et al., "Multipurpose Ultra and Superhydrophobic Surfaces Based on Oligodimethylsiloxane-Modified Nanosilica," ACS Applied Materials & Interfaces, vol. 6, No. 21, pp. 18998-19010 (2014).
Extended European Search Report dated Feb. 21, 2020 in EP Application No. 17830933.2.
Lauter et al., "Molecular Composites from Rigid-Rod Polybp-Pheylene)s with Oligo(Oxyethylene) Side Chains as Novel Polymer Electrolytes," Macromolecules, American Chemical Society, vol. 30, No. 7, pp. 2092-2101 (1997).
Su et al., "Synthesis and optoelectronic properties of thermally cross-linkable hole-transporting poly(fluorene-co-triphenylamine)," Polymer, vol. 52, No. 1, pp. 77-85 (2011).
Yang et al., "Synthesis and light emitting properties of sulfide-containing polyfluorenes and their nanocomposites with CdSe nanocrystals: A simple process to suppress keto-defect," Polymer, vol. 48, No. 1, pp. 116-128 (2006).

* cited by examiner

[Fig. 1]
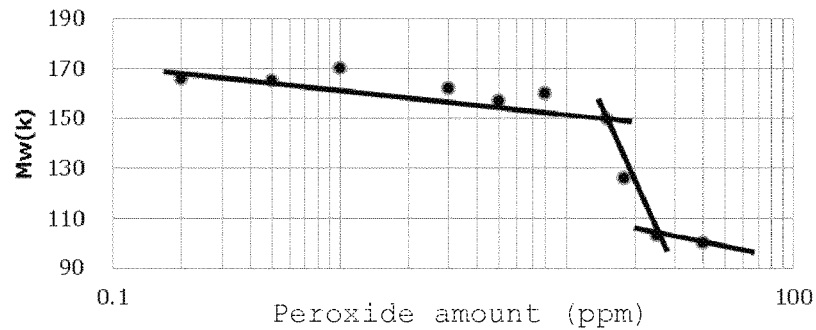
[Fig. 2]
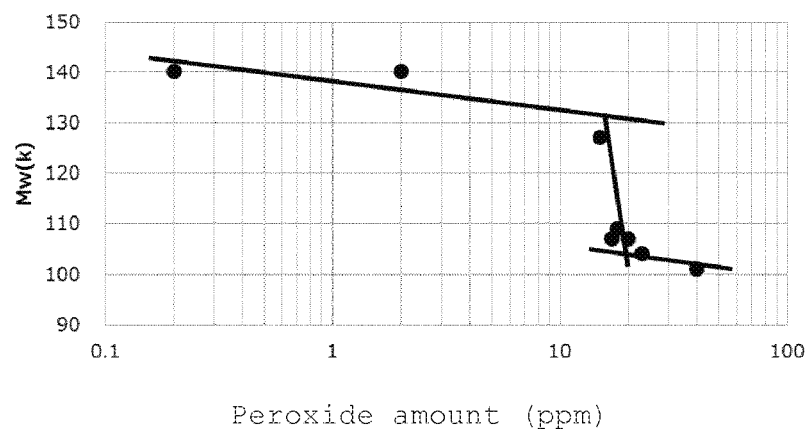
[Fig. 3]
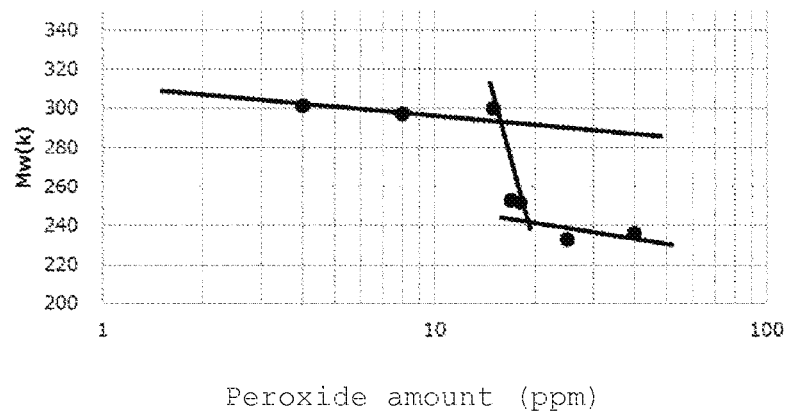

PRODUCTION METHOD OF POLYMER COMPOUND

CROSS-REFERENCE TO RELATED APPLICATION

This application is a Section 371 of International Application No. PCT/JP2017/025538, filed Jul. 13, 2017, which was published in the Japanese language on Jan. 25, 2018 under International Publication No. WO 2018/016414 A1, which claims priority under 35 U.S.C. § 119(b) to Japanese Application No. 2016-144151, filed Jul. 22, 2016, the disclosures of which are incorporated herein by reference in their entirety.

TECHNICAL FIELD

The present invention relates to a production method of a polymer compound.

BACKGROUND ART

As the material of organic electroluminescent devices and the like, for example, polymer compounds are used, and there is a correlation between the size of the molecular weight of the polymer compound and device characteristics, and it is desired to increase the molecular weight of the polymer compound.

Such a polymer compound can be synthesized, for example, by reacting a diboronic acid of an aromatic compound and a dihalide of an aromatic compound in the presence of a transition metal complex by the Suzuki Coupling method. Specifically, for example, a method of reacting a diboronic acid of fluorene and a dibromo form of carbazole by the Suzuki Coupling method is known (Non-Patent Document 1).

PRIOR ART DOCUMENT

Patent Document

Non-Patent Document 1: Journal of Materials Chemistry C, 2015, 3, 9664-9669

SUMMARY OF THE INVENTION

Problem to be Solved by the Invention

In the above-described method, however, it was difficult to obtain a polymer compound having sufficiently large molecular weight.

Then, the present invention has an object of providing a polymer compound production method capable of obtaining a polymer compound having sufficiently large molecular weight.

Means for Solving the Problem

The present invention provides the following [1] to [4].

[1] A production method of a polymer compound having a constitutional unit represented by the formula (3-1) and a constitutional unit represented by the formula (3-2), comprising a reaction step of reacting a compound represented by the formula (1) and a compound represented by the formula (2) in the presence of a transition metal complex, a base and an organic solvent having a peroxide amount of 15 ppm by weight or less:

[Chemical Formula 1]

[wherein,
$Ar^1$ and $Ar^2$ each independently represent a divalent aromatic hydrocarbon group, a divalent heteroaromatic group, a group in which a divalent aromatic hydrocarbon group and a divalent heteroaromatic group are bonded or a group represented by the formula (4), and these groups optionally have a substituent.
$X^1$ represents a chlorine atom, a bromine atom, an iodine atom or $—O—S(=O)_2R^{C1}$. $R^{C1}$ represents an alkyl group or an aryl group, and these groups optionally have a substituent. A plurality of $X^1$ may be the same or different.
$X^2$ represents $—B(OH)_2$, a borane residue, a borate ester residue or $—BF_3T$. T represents a lithium atom, a sodium atom, a potassium atom, a rubidium atom or a cesium atom. A plurality of $X^2$ may be the same or different.]

[Chemical Formula 2]

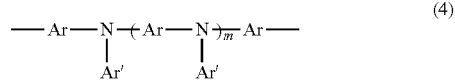

[wherein,
Ar represents a divalent aromatic hydrocarbon group, a divalent heteroaromatic group or a group in which a divalent aromatic hydrocarbon group and a divalent heteroaromatic group are bonded, and these groups optionally have a substituent. A plurality of Ar may be the same or different.
Ar' represents an aryl group or a monovalent heteroaromatic group, and these groups optionally have a substituent. When a plurality of Ar' are present, they may be the same or different.
m represents an integer of 0 to 2.].

[2] The polymer compound production method according to [1], wherein a radical chain inhibitor is further used in the above-described reaction step.

[3] The polymer compound production method according to or [2], wherein the above-described transition metal complex is a palladium complex.

[4] The polymer compound production method according to any one of [1] to [3], wherein the above-described organic solvent is an organic solvent obtained by contacting with an adsorbent.

BRIEF EXPLANATION OF DRAWINGS

FIG. 1 is a view showing a relation between the amounts of peroxides obtained in examples and comparative examples and the weight-average molecular weights thereof.

FIG. 2 is a view showing a relation between the amounts of peroxides obtained in examples and comparative examples and the weight-average molecular weights thereof.

FIG. 3 is a view showing a relation between the amounts of peroxides obtained in examples and comparative examples and the weight-average molecular weights thereof.

MODES FOR CARRYING OUT THE INVENTION

Suitable embodiments of the present invention will be illustrated in detail below.

The production method of the present invention is a production method of a polymer compound having a constitutional unit represented by the formula (3-1) and a constitutional unit represented by the formula (3-2), comprising a reaction step of reacting a compound represented by the formula (1) and a compound represented by the formula (2) in the presence of a transition metal complex, a base and an organic solvent having a peroxide amount of 15 ppm by weight or less.

The constitutional unit means a structure occurring at least once in a polymer compound.

The amount of the peroxide contained in the above-described organic solvent is usually 1 ppb by weight to 15 ppm by weight, preferably 10 ppb by weight to 10 ppm by weight, more preferably 50 ppb by weight to 5 ppm by weight, further preferably 100 ppb by weight to 1 ppm by weight. When two or more organic solvents are used in combination, "the amount of the peroxide contained in the organic solvent" means the total amount of peroxides contained in all organic solvents.

The amount of the peroxide contained in the above-described organic solvent can be measured, for example, by liquid chromatography.

Compound Represented by the Formula (1)

$X^1$ is preferably a chlorine atom, a bromine atom, an iodine atom, a mesylate group or a trifluoromethanesulfonate group, more preferably a chlorine atom, or a bromine atom, further preferably a bromine atom.

The alkyl group represented by $R^{C1}$ usually has a number of carbon atoms of 1 to 50 and includes, for example, unsubstituted alkyl groups such as a methyl group, an ethyl group, a n-propyl group, an isopropyl group, a n-butyl group, an isobutyl group, a tert-butyl group, a n-pentyl group, an isoamyl group, a 2-ethylbutyl group, a n-hexyl group, a cyclohexyl group, a n-heptyl group, a cyclohexylmethyl group, a cyclohexylethyl group, a n-octyl group, a 2-ethylhexyl group, a 3-n-propylheptyl group, a n-decyl group, a 3,7-dimethyloctyl group, a 2-ethyloctyl group, a 2-n-hexyldecyl group, a n-dodecyl group and the like; and substituted alkyl groups such as a trifluoromethyl group, a pentafluoroethyl group, a perfluorobutyl group, a perfluorohexyl group, a perfluorooctyl group, a 3-phenylpropyl group, a 3-(4-methylphenyl)propyl group, a 3-(3,5-di-n-hexylphenyl)propyl group, a 6-ethyloxyhexyl group and the like.

The aryl group represented by $R^{C1}$ usually has a number of carbon atoms of 6 to 60 and includes, for example, a phenyl group, a 1-naphthyl group, a 2-naphthyl group, a 1-anthracenyl group, a 2-anthracenyl group, a 9-anthracenyl group, a 1-pyrenyl group, a 2-pyrenyl group, a 4-pyrenyl group, a 2-fluorenyl group, a 3-fluorenyl group, a 4-fluorenyl group, a 2-phenylphenyl group, a 3-phenylphenyl group and a 4-phenylphenyl group, and groups obtained by substituting a hydrogen atom in these groups with an alkyl group, an alkoxy group, an aryl group, a fluorine atom or the like.

The group represented by $-O-S(=O)_2R^{C1}$ includes, for example, a mesylate group, a trifluoromethanesulfonate group and a p-toluenesulfonate group.

$Ar^1$ is preferably a divalent aromatic hydrocarbon group or a group represented by the formula (4), more preferably a group represented by the formula (4), and these groups optionally have a substituent, since molecular weight controllability is excellent.

The number of carbon atoms of the divalent aromatic hydrocarbon group represented by $Ar^1$, not including the number of carbon atoms of the substituent, is usually 6 to 60, preferably 6 to 30, more preferably 6 to 18.

The divalent aromatic hydrocarbon group includes, for example, a phenylene group, a naphthalenediyl group, an anthracenediyl group, a phenanthrenediyl group, a dihydrophenanthrenediyl group, a naphthacenediyl group, a fluorenediyl group, a pyrenediyl group, a perylenediyl group, a chrysenediyl group and a biphenylene group. A hydrogen atom in these divalent aromatic hydrocarbon groups may be substituted with an alkyl group, an alkoxy group, an aryl group, a fluorine atom, a metal complex-containing group or the like (hereinafter, referred to also as "substituent"). Further, a hydrogen atom in these divalent aromatic hydrocarbon groups may be substituted with a metal complex-containing group.

The alkyl group and the aryl group as the substituent are the same as the alkyl group and the aryl group represented by $R^{C1}$ described above. The alkyl group and the aryl group as the substituent optionally further have a substituent.

The alkoxy group as the substituent usually has a number of carbon atoms of 1 to 40 and includes, for example, a methoxy group, an ethoxy group, a n-propyloxy group, an isopropyloxy group, a n-butyloxy group, an isobutyloxy group, a tert-butyloxy group, a n-pentyloxy group, a n-hexyloxy group, a cyclohexyloxy group, a n-heptyloxy group, a n-octyloxy group, a 2-ethylhexyloxy group, a n-nonyloxy group, a n-decyloxy group, a 3,7-dimethyloctyloxy group and a lauryloxy group. The alkoxy group as the substituent optionally further has a substituent.

The metal complex-containing group as the substituent includes, for example, groups represented by any of the formula (MC-1) and the formula (MC-2).

[Chemical Formula 3]

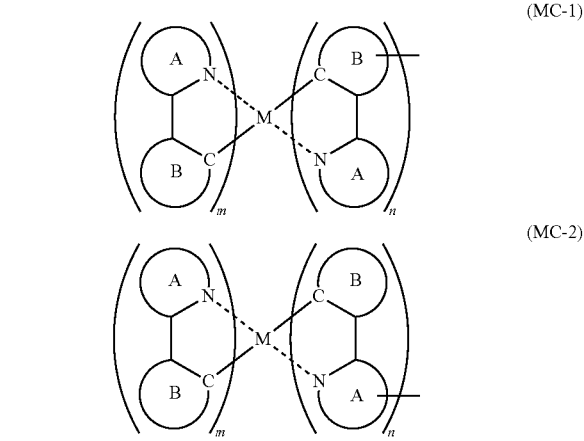

(wherein, M represents an iridium atom or a platinum atom, m=2 and n=1 when M is an iridium atom, while m=3 and n=1 or m=1 and n=1 when M is a platinum atom. Ring A represents a nitrogen atom-containing cyclic structure optionally having a substituent. Ring B represents a carbon atom-containing cyclic structure optionally having a substituent.)

Ring A is preferably a heteroaromatic ring, more preferably a heteroaromatic ring having 2 to 9 carbon atoms.

Ring B is preferably an aromatic hydrocarbon ring, more preferably an aromatic hydrocarbon ring having 6 to 12 carbon atoms.

The metal complex-containing group as the substituent optionally further has a substituent.

The compound represented by the formula (MC-1) includes, for example, compounds represented by the formula (MC-1a) to the formula (MC-1i) and is preferably a compound represented by the formula (MC-1b), the formula (MC-1c), the formula (MC-1d) or the formula (MC-1e), more preferably a compound represented by the formula (MC-1e). A part or all of hydrogen atoms in these compounds may be substituted with substituents, and a plurality of the substituents may be combined together to form a ring.

[Chemical Formula 4]

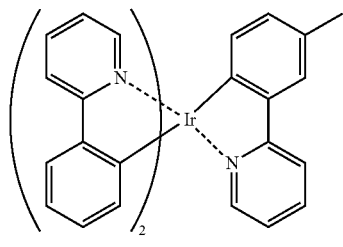
(MC-1a)

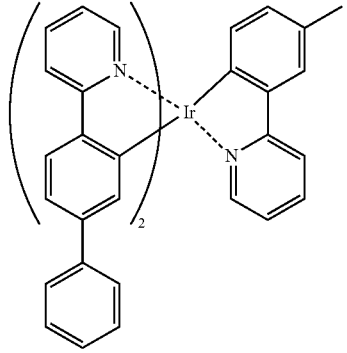
(MC-1b)

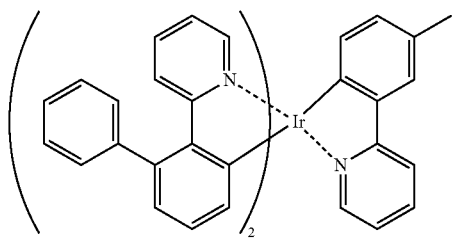
(MC-1c)

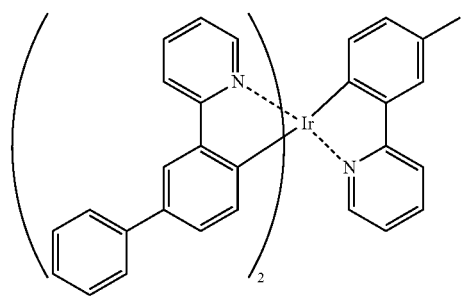
(MC-1d)

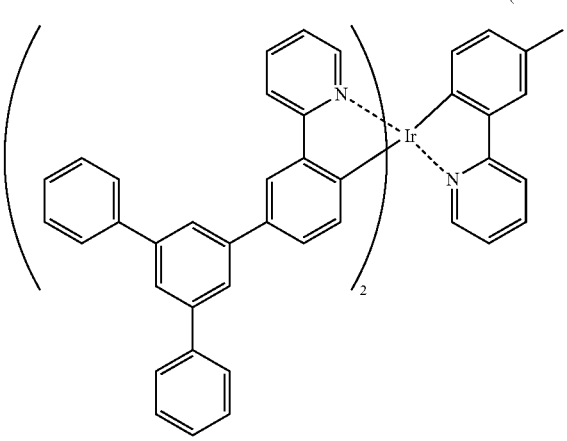
(MC-1e)

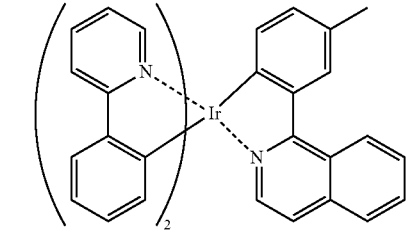
(MC-1f)

(MC-1g)

(MC-1h)

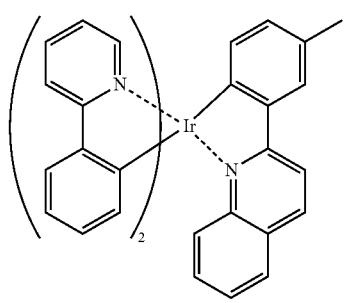
(MC-1i)

The compound represented by the formula (MC-2) includes, for example, compounds represented by the formula (MC-2a) to the formula (MC-2k) and is preferably a compound represented by the formula (MC-2b), the formula (MC-2c), the formula (MC-2d) or the formula (MC-2e), more preferably a compound represented by the formula (MC-2e). A part or all of hydrogen atoms in these compounds may be substituted with substituents, and a plurality of the substituents may be combined together to form a ring.

[Chemical Formula 5]

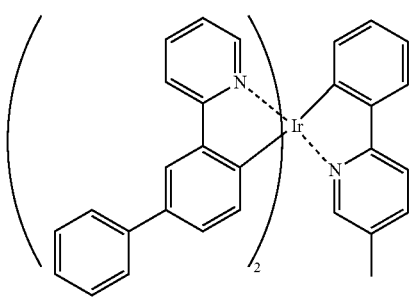
(MC-2d)

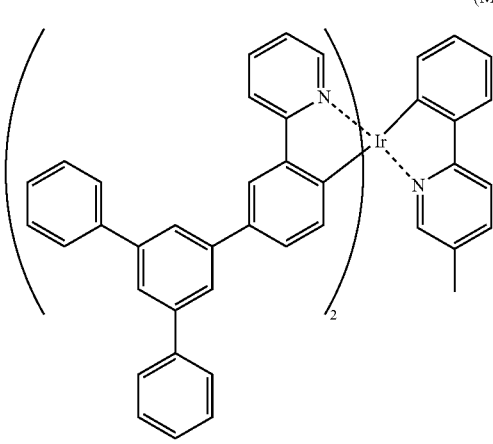
(MC-2e)

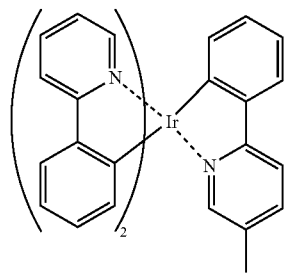
(MC-2a)

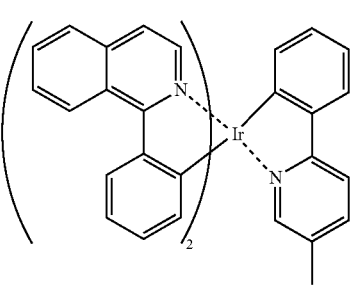
(MC-2f)

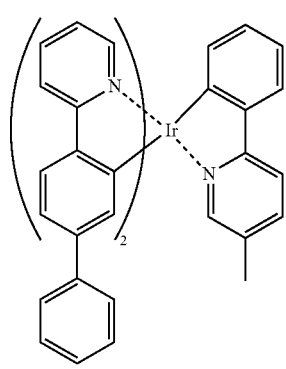
(MC-2b)

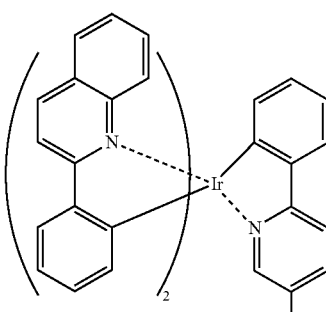
(MC-2g)

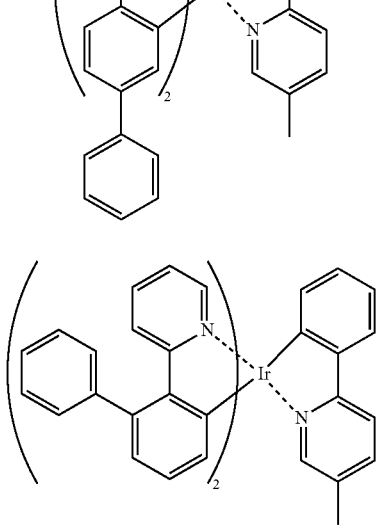
(MC-2c)

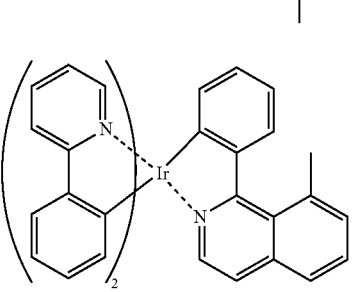
(MC-2h)

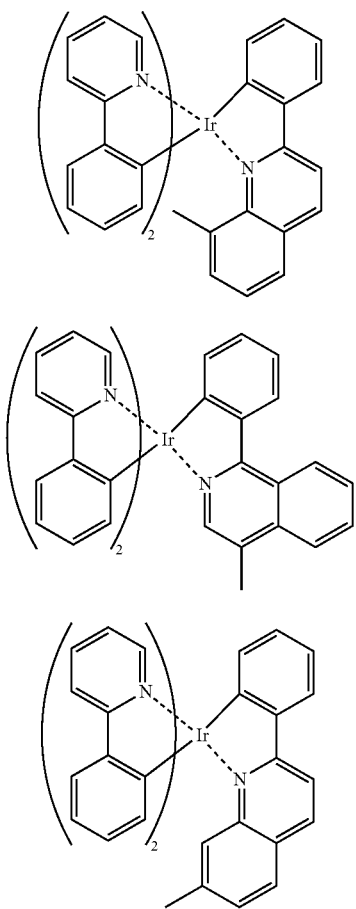

(MC-2i)

(MC-2j)

(MC-2k)

The number of carbon atoms of the divalent heteroaromatic group represented by $Ar^1$, not including the number of carbon atoms of the substituent, is usually 2 to 60, preferably 3 to 20, more preferably 4 to 15.

The divalent heteroaromatic group includes, for example, a pyridinediyl group, a diazabenzenediyl group, a triazinediyl group, an azanaphthalenediyl group, a diazanaphthalenediyl group, a carbazolediyl group, a dibenzofurandiyl group, a dibenzothiophenediyl group, a dibenzosilolediyl group, a phenoxazinediyl group, a phenothiazinediyl group, an acridinediyl group, a dihydroacridinediyl group, a furandiyl group, a thiophenediyl group, an azolediyl group, a diazolediyl group, a triazolediyl group and a bipyridinediyl group.

A hydrogen atom in these divalent heteroaromatic groups may be substituted with an alkyl group, an alkoxy group, an aryl group, a fluorine atom or the like.

The alkyl group and the aryl group as the substituent are the same as the alkyl group and the aryl group represented by $R^{C1}$ described above.

The alkoxy group as the substituent is the same as described above.

The group in which a divalent aromatic hydrocarbon group and a divalent heteroaromatic group are bonded represented by $Ar^1$ includes, for example, a group in which one divalent aromatic hydrocarbon group and one divalent heteroaromatic group are bonded and a group in which two divalent aromatic hydrocarbon groups and one divalent heteroaromatic group are bonded and is preferably a group in which two phenylene groups and one triazolediyl group are bonded.

In the group represented by the formula (4), the explanation and examples of the divalent aromatic hydrocarbon group, the divalent heteroaromatic group and the group in which a divalent aromatic hydrocarbon group and a divalent heteroaromatic group are bonded represented by Ar are the same as the explanation and examples of the divalent aromatic hydrocarbon group, the divalent heteroaromatic group and the group in which a divalent aromatic hydrocarbon group and a divalent heteroaromatic group are bonded represented by $Ar^1$, and Ar is preferably a divalent aromatic hydrocarbon group, more preferably a phenylene group.

In the group represented by the formula (4), the explanation and examples of the aryl group represented by Ar' are the same as the explanation and examples of the aryl group represented by $R^{C1}$, and the aryl group represented by Ar' is preferably an alkylaryl group, more preferably an alkylphenyl group.

In the group represented by the formula (4), the monovalent heteroaromatic group represented by Ar' is the same as that obtained by substituting one connecting bond in the explanation and examples of the divalent heteroaromatic group represented by $Ar^1$ with a hydrogen atom.

In the group represented by the formula (4), m is preferably 0.

The compound represented by the formula (1) includes, for example, compounds represented by the formula (a) to the formula (n) and is preferably a compound represented by the formula (a), the formula (e), the formula (j), the formula (k) or the formula (n), more preferably a compound represented by the formula (a), the formula (j) or the formula (n), further preferably a compound represented by the formula (j). A part or all of hydrogen atoms in these compounds may be substituted with substituents, and a plurality of the substituents may be combined together to form a ring.

[Chemical Formula 6]

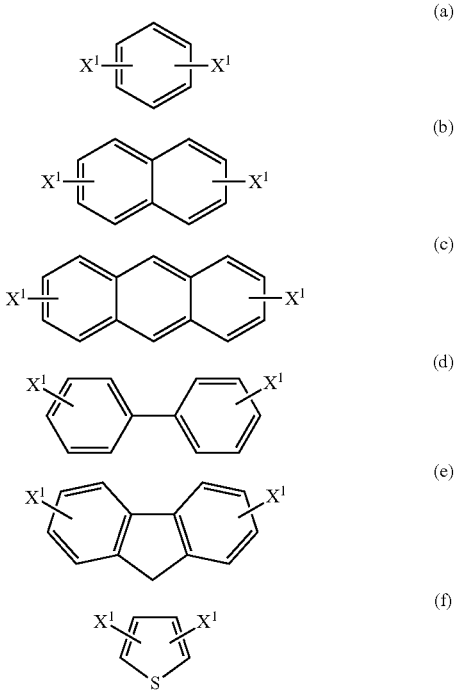

-continued

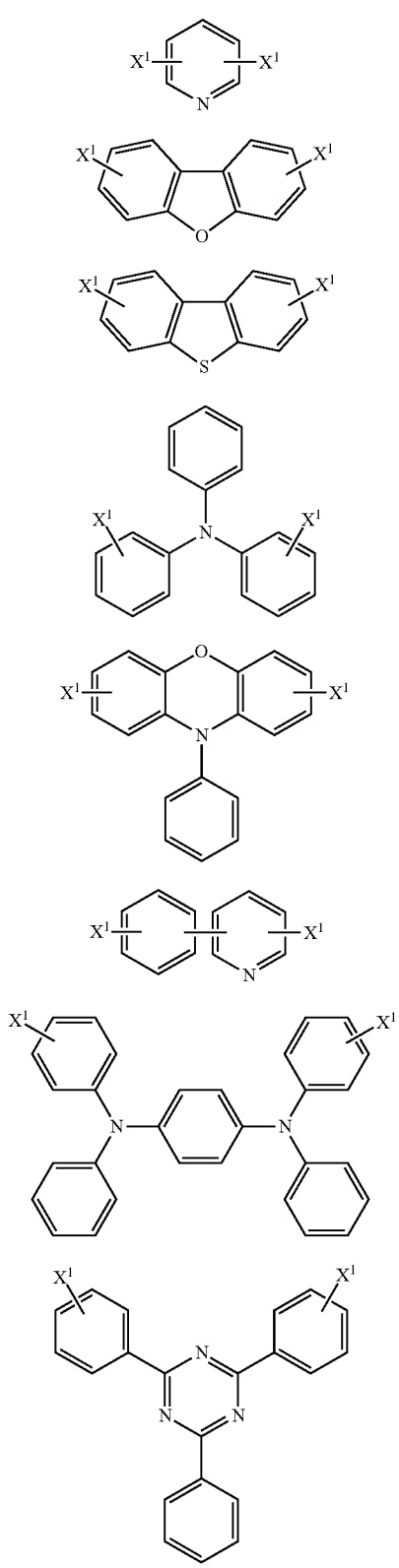

(wherein, $X^1$ represents the same meaning as described above. A plurality of $X^1$ may be the same or different.)

The compound represented by the formula (1) is preferably 9,10-dichloroanthracene, 1,3-dichlorobenzene, 2,7-dichlorobenzaldehyde, 1,4-dichloro-2-fluorobenzene, 2,6-dichloropyridine, 3,5-dichloropyridine, 9,10-diiodoanthracene, 1,3-diiodobenzene, 4,4'-diiodobiphenyl, 1,4-diiodo-2-fluorobenzene, 1,1'-bi-2-naphtholbis(trifluoromethanesulfonate), 2,7-dibromo-9,9-dihexylfluorene, 2,7-dibromo-9,9-dioctylfluorene, 1,4-dibromobenzene, 1,3-dibromobenzene, 2,4-bis(4-bromophenyl)-6-phenyl-1,3,5-triazine, 2,5-dibromo-3-hexylthiopnene or bis(4-bromophenyl)phenylamine. A part or all of hydrogen atoms in these compounds may be substituted with substituents, and a plurality of the substituents may be combined together to form a ring.

The compound represented by the formula (1) is a commercially available product or can be obtained by producing according to a known method.

The compound represented by the formula (1) may be used singly or in combination of two or more kinds thereof.

Compound Represented by the Formula (2)

The divalent aromatic hydrocarbon group, the divalent heteroaromatic group, the group in which a divalent aromatic hydrocarbon group and a divalent heteroaromatic group are bonded and the group represented by the formula (4) represented by $Ar^2$ are the same as the divalent aromatic hydrocarbon group, the divalent heteroaromatic group, the group in which a divalent aromatic hydrocarbon group and a divalent heteroaromatic group are bonded and the group represented by the formula (4) represented by $Ar^1$, and $Ar^2$ is preferably a divalent aromatic hydrocarbon group, more preferably a fluorenediyl group, and these groups optionally have a substituent.

The borane residue represented by $X^2$ includes, for example, a group represented by the formula (G-1).

[Chemical Formula 7]

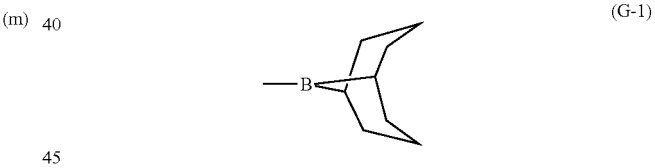
(G-1)

The borate ester residue represented by $X^2$ includes, for example, groups represented by the formula (G-2) to the formula (G-10) and is preferably a group represented by the formula (G-4) or the formula (G-5).

[Chemical Formula 8]

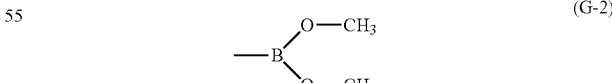
(G-2)

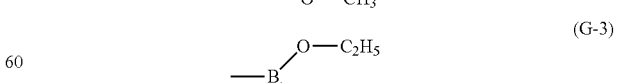
(G-3)

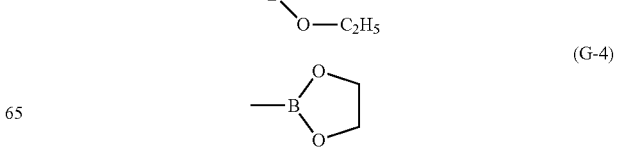
(G-4)

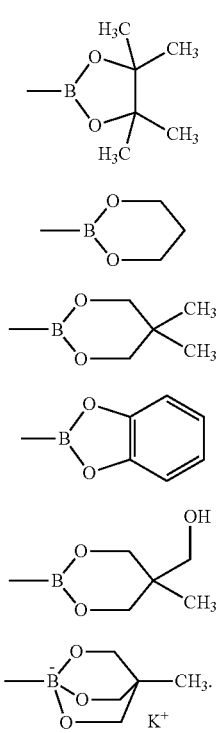

(G-5)
(G-6)
(G-7)
(G-8)
(G-9)
(G-10)

$X^2$ is preferably a borate ester residue.

The compound represented by the formula (2) includes, for example, compounds represented by the formula (o) to the formula (aa) and is preferably a compound represented by the formula (o), the formula (s), the formula (x) or the formula (y), more preferably a compound represented by the formula (s). A part or all of hydrogen atoms in these compounds may be substituted with substituents, and a plurality of the substituents may be combined together to form a ring.

[Chemical Formula 9]

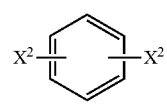
(o)

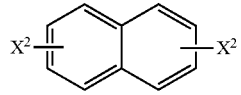
(p)

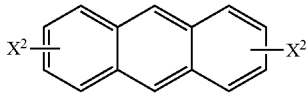
(q)

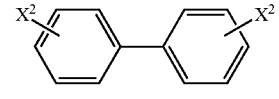
(r)

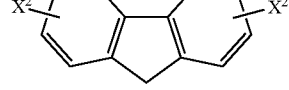
(s)

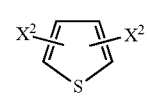
(t)

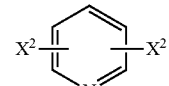
(u)

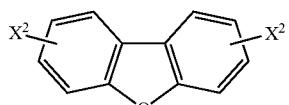
(v)

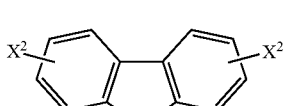
(w)

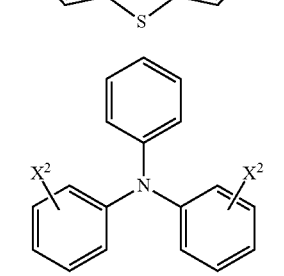
(x)

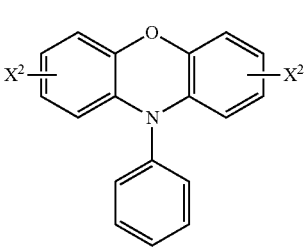
(y)

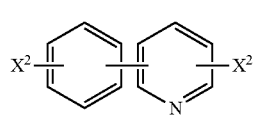
(z)

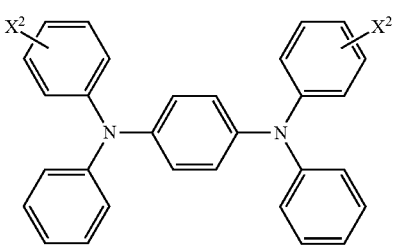
(aa)

The compound represented by the formula (2) is preferably 1,4-bis(4,4,5,5-tetramethyl-1,3,2-dioxaborolan-2-yl)benzene, 1,3-bis(4,4,5,5-tetramethyl-1,3,2-dioxaborolan-2-yl)benzene, 1,3,5-tris(4,4,5,5-tetramethyl-1,3,2-dioxaborolan-2-yl)benzene, 9,9-dimethyl-2,7-bis(4,4,5,5-tetramethyl-1,3,2-dioxaborolan-2-yl)fluorene, 9,10-bis(4,4,5,5-tetramethyl-1,3,2-dioxaborolan-2-yl)anthracene, 1,2-bis(4,4,5,5-tetramethyl-1,3,2-dioxaborolan-2-yl)stilbene, 2,7-bis(4,4,5,5-tetramethyl-1,3,2-dioxaborolan-2-yl)-9,9-dihexylfluorene, 2,7-bis(4,4,5,5-tetramethyl-1,3,2-dioxaborolan-2-yl)-9,9-dioctylfluorene, 1,4-bis(4,4,5,5-tetramethyl-1,3,2-dioxaborolan-2-yl)-2-methyl-5-octylbenzene, 2,5-bis(4,4,5,5-tetramethyl-1,3,2- dioxaborolan-2-yl)thiophene or 5,5'-bis(4,4,5,5-tetramethyl-1,3,2-dioxaborolan-2-yl)-2,2'-bithiophene.

The compound represented by the formula (2) is a commercially available product or can be obtained by producing according to a known method.

The compound represented by the formula (2) may be used singly or in combination of two or more kinds thereof.

As the combination of a compound represented by the formula (1) with a compound represented by the formula (2), a combination of a compound represented by the formula (1) in which $Ar^1$ is a group represented by the formula (4) optionally having a substituent and $X^1$ is a bromine atom with a compound represented by the formula (2) in which $Ar^2$ is a divalent aromatic hydrocarbon group optionally having a substituent and $X^2$ is a borate ester residue is preferable.

Polymer Compound $Ar^1$ and $Ar^2$ are the same as described above.

The polymer compound having a constitutional unit represented by the formula (3-1) and a constitutional unit represented by the formula (3-2) includes, for example, polymer compounds represented by the formula (ab) to the formula (af) and is preferably a polymer compound represented by the formula (ae). A part or all of hydrogen atoms in these compounds may be substituted with substituents, and a plurality of the substituents may be combined together to form a ring.

[Chemical Formula 10]

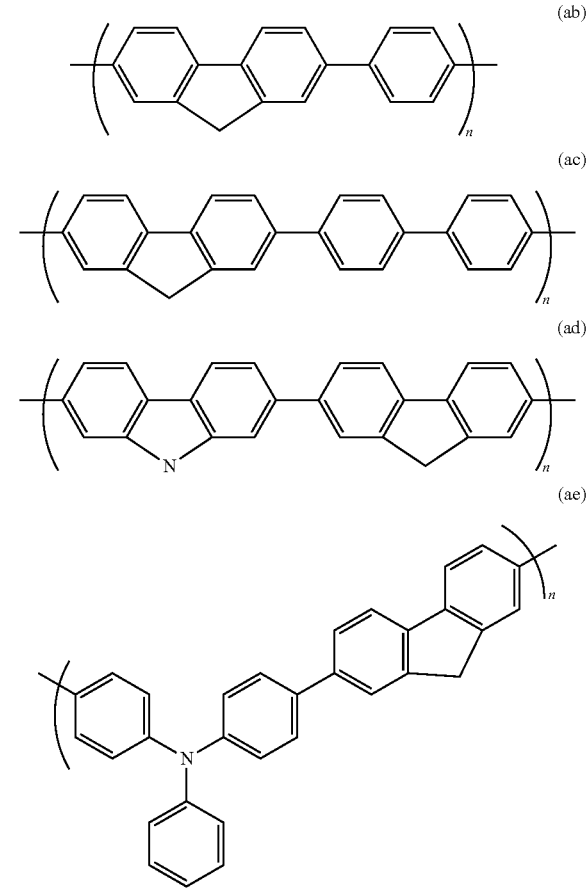

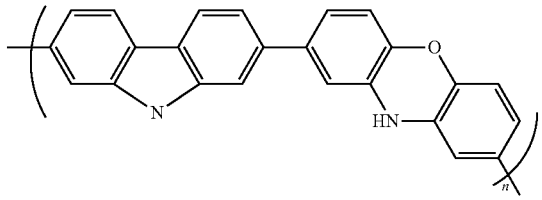

(wherein, n represents the number of a repeating unit)

The polymer compound having a constitutional unit represented by the formula (3-1) and a constitutional unit represented by the formula (3-2) may be any polymerization type such as a random copolymer, a block copolymer, an alternative copolymer and the like.

The polymer compound having a constitutional unit represented by the formula (3-1) and a constitutional unit represented by the formula (3-2) has a polystyrene-equivalent weight-average molecular weight of usually $1\times10^4$ to $1\times10^7$, preferably $1\times10^4$ to $1\times10^6$. This molecular weight can be measured usually by gel permeation chromatography (GPC).

Transition Metal Complex

As the transition metal complex, a Group 10 transition metal complex is preferable. The Group 10 transition metal complex includes, for example, a zerovalent or divalent nickel complex, a zerovalent or divalent palladium complex and a zerovalent or divalent platinum complex and is preferably a zerovalent or divalent palladium complex.

The transition metal complex includes, for example, palladium complexes having a ligand such as phosphine, bipyridyl, olefin and the like.

The transition metal complex includes, for example, dichlorobis(triphenylphosphine)palladium, dichlorobis[tris(2-methoxyphenyl)phosphine]palladium, [tetrakis(triphenylphosphine)]palladium, [tris(dibenzylideneacetone)]dipalladium, dishlorobis[dicyclopentyl(2-methoxyphenyl)phosphine]palladium, palladium acetate, dichlorobis[dicyclopentyl(2,6-dimethoxyphenyl)phosphine]palladium and dichlorobis[di-tert-butyl(3,5-di-tert-butylphenyl)phosphine]palladium, and these palladium complexes further having a ligand such as triphenylphosphine, tri (tert-butylphosphine), tricyclohexylphosphine, diphenylphosphinopropane, bipyridyl and the like and is preferably dichlorobis(triphenylphosphine)palladium, dichlorobis[tris(2-methoxyphenyl)phosphine]palladium or [tetrakis (triphenylphosphine)]palladium, more preferably dichlorobis(triphenylphosphine)palladium or dichlorobis[tris(2-methoxyphenyl)phosphine]palladium.

The transition metal complex may be used singly or in combination of two or more kinds thereof.

Base

The base includes, for example, inorganic bases such as sodium carbonate, potassium carbonate, cesium carbonate, potassium fluoride, cesium fluoride, tripotassium phosphate and the like; organic bases such as tetrabutylammonium fluoride, tetraethylammonium fluoride, tetramethylammonium fluoride, tetrabutylammonium hydroxide, tetraethylammonium hydroxide, tetramethylammonium hydroxide and the like and is preferably an organic base, more preferably tetrabutylammonium hydroxide, tetraethylammonium hydroxide or tetramethylammonium hydroxide.

The base may be used singly or in combination of two or more kinds thereof.

Reaction Conditions

The reaction temperature is usually −100° C. to 200° C., preferably 0° C. to 150° C., more preferably 0° C. to 90° C.

The reaction pressure is usually atmospheric pressure.

The stirring power of the reaction is usually 0.001 kW/m$^3$ to 10 kW/m$^3$, preferably 0.01 kW/m$^3$ to 2 kW/m$^3$, more preferably 0.1 kW/m$^3$ to 1 kW/m$^3$.

The reaction time is usually 1 hour or more, preferably 1 hour to 96 hours, more preferably 1 hour to 48 hours.

Phase Transfer Catalyst

In the above-described reaction step, a phase transfer catalyst may be further used. The phase transfer catalyst includes, for example, tetrabutylammonium chloride, tetrabutylammonium bromide and tetrabutylammonium iodide.

The phase transfer catalyst may be used singly or in combination of two or more kinds thereof.

Organic Solvent

The organic solvent includes, for example, aromatic hydrocarbon solvents such as toluene, xylene, mesitylene and the like; ether solvents such as tetrahydrofuran, 1,4-dioxane, dimethoxyethane and the like; amide solvents such as N,N-dimethylacetamide, N,N-dimethylformamide and the like; alcohol solvents such as methanol, ethanol, ethylene glycol, isopropyl alcohol, propylene glycol, ethylene glycol monomethyl ether, ethylene glycol monobutyl ether and the like; ketone solvents such as acetone, methyl ethyl ketone, cyclopentanone, cyclohexanone, methyl amyl ketone, methyl isobutyl ketone, N-methyl-2-pyrrolidinone and the like; aliphatic hydrocarbon solvents such as pentane, hexane, heptane and the like; nitrile solvents such as acetonitrile and the like; and halogenated hydrocarbon solvents such as chloroform and the like and is preferably an aromatic hydrocarbon solvent or an ether solvent, more preferably toluene, xylene or mesitylene. These organic solvents may be used together with water.

The organic solvent may be used singly or in combination of two or more kinds thereof.

It is preferable that the organic solvent is purified before the above-described reaction step. The purification method includes, for example, a method of purifying an organic solvent by distillation; a method of contacting an alumina type adsorbent such as active alumina and the like, a silica type adsorbent such as silica gel, aerogel, colloidal gel and the like, a zeolite type adsorbent such as aluminosilicate zeolite, metallosilicate zeolite, aluminophosphate zeolite and the like, a clay type adsorbent such as activated white earth, montmorillonite, smectite and the like, a mesoporous type adsorbent such as mesoporous silica and the like, a carbon type adsorbent such as activated carbon, carbon fiber, charcoal and the like, a synthetic adsorbent such as an ion exchange resin, a chelate resin, a biomass adsorbent and the like, or an adsorbent such as hydroxyapatite, heteropolyacid salt, porous manganese oxide and the like with an organic solvent and adsorbing and removing impurities in the organic solvent; and a method of using a solvent purification apparatus, and is preferably a method of contacting an adsorbent with an organic solvent and adsorbing and removing impurities in the organic solvent, more preferably a method of contacting an alumina type adsorbent with an organic solvent and adsorbing and removing impurities in the organic solvent.

The method for adsorption and removal includes, for example, a method of adding an adsorbent into an organic solvent and stirring the mixture and a method of passing an organic solvent through a column filled with an adsorbent and is preferably a method of passing an organic solvent through a column filled with an adsorbent.

The contact time of the adsorbent is usually 10 seconds to 3 hours, preferably 30 seconds to 1 hour.

The contact temperature of the adsorbent is usually 0° C. to 150° C., preferably 10° C. to 40° C.

As the purification method, one method may be used, or two or more methods may be used.

Radical Chain Inhibitor

In the above-described reaction step, a radical chain inhibitor may be further used. The radical chain inhibitor includes, for example, aromatic amine type radical chain inhibitors, hindered amine type radical chain inhibitors, monophenol type radical chain inhibitors, bisphenol type radical chain inhibitors and polyphenol type radical chain inhibitors and is preferably a monophenol type radical chain inhibitor, more preferably 2,4-dimethyl-6-tert-butylphenol, 2,6-di-tert-butyl-4-methylphenol, 2,6-di-tert-butyl-4-ethylphenol or 2,4,6-tri-tert-butylphenol.

The radical chain inhibitor may be used singly or in combination of two or more kinds thereof.

The radical chain inhibitor may advantageously be present in an organic solvent during the reaction, and it may be added when a compound represented by the formula (1) or a compound represented by the formula (2) is dissolved in an organic solvent or may be previously dissolved in an organic solvent to prepare a solution to which the compound is added.

In the production method of the present invention, the order of mixing of each raw material, each reagent and each solvent is not restricted.

<Other Steps>

In the production method of the present invention, any steps such as an end-capping step, an extraction step, a drying step, a purification step and the like can be carried out after the above-described reaction step.

The end-capping step is a step of adding a monofunctional compound substituting for a reactive end group in the polymer compound after completion of the reaction (that is, after elongation of the molecular weight of the polymer compound is stopped).

Here, "elongation of the molecular weight of the polymer compound is stopped" means a state in which the change in molecular weight is 3% or less as compared with 30 minutes before when the molecular weight is measured at intervals of 30 minutes during the reaction.

The reactive end group includes, for example, a chlorine atom, a bromine atom, an iodine atom, —O—S(=O)$_2$R$^{C1}$, —B(OH)$_2$, a borane residue, a borate ester residue and —BF$_3$T.

The monofunctional compound includes, for example, groups in which an aryl group or a monovalent heteroaromatic group and a reactive end group are bonded.

The extraction step is a step of mixing a polymer compound having a constitutional unit represented by the formula (3-1) and a constitutional unit represented by the formula (3-2) with at least one of acidic aqueous solutions such as hydrochloric acid and the like, basic aqueous solutions such as an ammonia aqueous solution and the like and water, and separating the mixed liquid.

The drying step is a step of drying a polymer compound having a constitutional unit represented by the formula (3-1) and a constitutional unit represented by the formula (3-2) at normal pressure or while reducing pressure.

The purification step is a step of purifying a polymer compound having a constitutional unit represented by the formula (3-1) and a constitutional unit represented by the formula (3-2) by, for example, reprecipitation, continuous extraction with a Soxhlet extractor, or column chromatography.

<Use Amount of Reagent and Raw Material>

The use amount of the compound represented by the formula (1) is usually 0.7 mol to 1.5 mol, preferably 0.8 mol to 1.2 mol, more preferably 0.9 mol to 1.1 mol, with respect to 1 mol of the use amount of the compound represented by the formula (2).

The use amount of the base is usually 0.1 mol to 200 mol, preferably 0.3 mol to 100 mol, more preferably 0.5 mol to 80 mol, with respect to 1 mol of the total use amount of the compound represented by the formula (1) and the compound represented by the formula (2).

The use amount of the transition metal complex is usually 0.000001 mol to 3 mol, preferably 0.000005 mol to 0.8 mol, more preferably 0.00001 mol to 0.2 mol, with respect to 1 mol of the total use amount of the compound represented by the formula (1) and the compound represented by the formula (2).

The use amount of the phase transfer catalyst is usually 0.001 mol to 50 mol, preferably 0.005 mol to 10 mol, more preferably 0.01 mol to 1 mol, with respect to 1 mol of the total use amount of the compound represented by the formula (1) and the compound represented by the formula (2).

The use amount of the organic solvent is usually 1 mol to 1000 mol, preferably 5 mol to 500 mol, more preferably 10 mol to 200 mol, with respect to 1 mol of the total use amount of the compound represented by the formula (1) and the compound represented by the formula (2).

The use amount of the radical chain inhibitor is usually 0.000001 mol to 3 mol, preferably 0.000005 mol to 0.8 mol, more preferably 0.00001 mol to 0.2 mol, with respect to 1 mol of the total use amount of the compound represented by the formula (1) and the compound represented by the formula (2).

EXAMPLES

Examples will be shown below for illustrating the present invention further in detail, but the present invention is not limited to them.

<Molecular Weight Analysis>

The polystyrene-equivalent weight-average molecular weight (Mw) of a polymer compound was determined by GPC.

Analysis Conditions
measuring apparatus: HLC-8320GPC (manufactured by Tosoh Corp.)
column: PLgel 10 μm MIXED-B (manufactured by Tosoh Corp.)
column temperature: 40° C.
mobile phase: tetrahydrofuran
flow rate: 0.5 mL/min
detection wavelength: 228 nm <Peroxide Amount Analysis>

The peroxide amount in a solvent was determined by liquid chromatography equipped with an ultraviolet detection means.

Analysis Conditions
measuring apparatus: LC-20A (manufactured by Shimadzu Corp.)
column: L-column2 ODS (manufactured by Chemicals Evaluation and Research Institute, Japan)
column temperature: 40° C.
mobile phase: water, acetonitrile
flow rate: 1.0 mL/min
detection wavelength: 254 nm Example 1

An inert gas atmosphere was prepared in a reaction vessel, then, a compound (M2) (0.0935 g, 0.145 mmol), a compound (M1) (0.0669 g, 0.145 mmol), dichlorobis[tris(2-methoxyphenyl)phosphine]palladium (1.28 mg, 0.00145 mmol) and toluene having a peroxide amount of 0.2 ppm by weight (5 g) were mixed, and heated at 86° C. To the resultant mixture was added a 20% by weight tetraethylammonium hydroxide aqueous solution (0.54 g), and the mixture was mixed by a magnetic stirrer at a revolution speed of a stirring bar of 1000 rpm for 3 hours while heating, to obtain a polymer compound (P3). The polymer compound (P3) had an Mw of 166×10³.

[Chemical Formula 11]

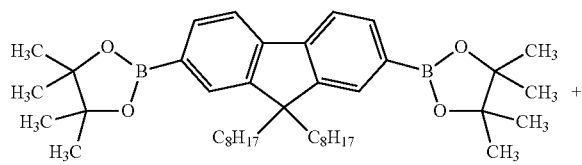

Compound (M2)

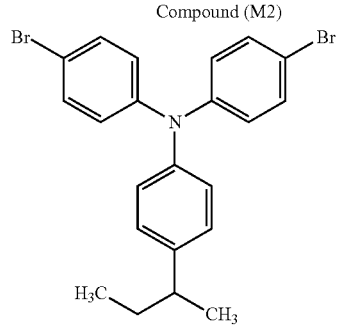

Compound (M1)

Pd catalyst
TEAH
―――――→
toluene

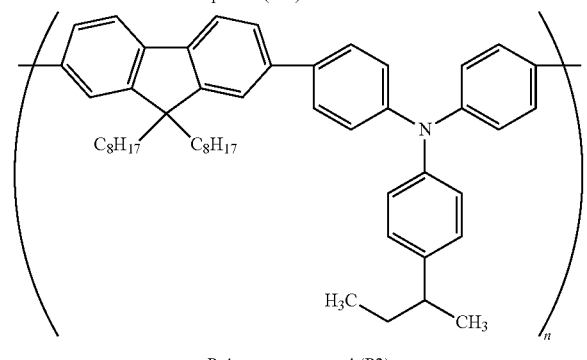

Polymer compound (P3)

(wherein, n represents the number of a repeating unit)

Example 2

A polymer compound (P3) was synthesized by the same manner as in Example 1 except that toluene having a peroxide amount of 0.5 ppm by weight was used instead of toluene having a peroxide amount of 0.2 ppm by weight in Example 1. The polymer compound (P3) had an Mw of 165×10³.

Example 3

A polymer compound (P3) was synthesized by the same manner as in Example 1 except that toluene having a peroxide amount of 1 ppm by weight was used instead of toluene having a peroxide amount of 0.2 ppm by weight in Example 1. The polymer compound (P3) had an Mw of $170\times10^3$.

Example 4

A polymer compound (P3) was synthesized by the same manner as in Example 1 except that toluene having a peroxide amount of 3 ppm by weight was used instead of toluene having a peroxide amount of 0.2 ppm by weight in Example 1. The polymer compound (P3) had an Mw of $162\times10^3$.

Example 5

A polymer compound (P3) was synthesized by the same manner as in Example 1 except that toluene having a peroxide amount of 5 ppm by weight was used instead of toluene having a peroxide amount of 0.2 ppm by weight in Example 1. The polymer compound (P3) had an Mw of $157\times10^3$.

Example 6

A polymer compound (P3) was synthesized by the same manner as in Example 1 except that toluene having a peroxide amount of 8 ppm by weight was used instead of toluene having a peroxide amount of 0.2 ppm by weight in Example 1. The polymer compound (P3) had an Mw of $160\times10^3$.

Example 7

A polymer compound (P3) was synthesized by the same manner as in Example 1 except that toluene having a peroxide amount of 15 ppm by weight was used instead of toluene having a peroxide amount of 0.2 ppm by weight in Example 1. The polymer compound (P3) had an Mw of $150\times10^3$.

Comparative Example 1

A polymer compound (P3) was synthesized by the same manner as in Example 1 except that toluene having a peroxide amount of 18 ppm by weight was used instead of toluene having a peroxide amount of 0.2 ppm by weight in Example 1. The polymer compound (P3) had an Mw of $126\times10^3$.

Comparative Example 2

A polymer compound (P3) was synthesized by the same manner as in Comparative Example 1 except that toluene having a peroxide amount of 25 ppm by weight was used instead of toluene having a peroxide amount of 0.2 ppm by weight in Example 1. The polymer compound (P3) had an Mw of $103\times10^3$.

Comparative Example 3

A polymer compound (P3) was synthesized by the same manner as in Comparative Example 1 except that toluene having a peroxide amount of 40 ppm by weight was used instead of toluene having a peroxide amount of 0.2 ppm by weight in Example 1. The polymer compound (P3) had an Mw of $100\times10^3$.

TABLE 1

|  | Example | | | | | | | Comparative Example | | |
| --- | --- | --- | --- | --- | --- | --- | --- | --- | --- | --- |
|  | 1 | 2 | 3 | 4 | 5 | 6 | 7 | 1 | 2 | 3 |
| Peroxide amount (ppm by weight) | 0.2 | 0.5 | 1 | 3 | 5 | 8 | 15 | 18 | 25 | 40 |
| Mw ($\times 10^3$) | 166 | 165 | 170 | 162 | 157 | 160 | 150 | 126 | 103 | 100 |

Example 8

An inert gas atmosphere was prepared in a reaction vessel, then, a compound (M2) (0.1489 g, 0.231 mmol), a compound (M3) (0.1481 g, 0.231 mmol), dichlorobis[tris(2-methoxyphenyl)phosphine]palladium (1.02 mg, 0.00116 mmol) and toluene having a peroxide amount of 0.2 ppm by weight (10 g) were mixed, and heated at 86° C. To the resultant mixture was added a 20% by weight tetraethylammonium hydroxide aqueous solution (0.85 g), and the mixture was mixed by a magnetic stirrer at a revolution speed of a stirring bar of 1000 rpm for 3 hours while heating, to obtain a polymer compound (P4). The polymer compound (P4) had an Mw of $140\times10^3$.

[Chemical Formula 12]

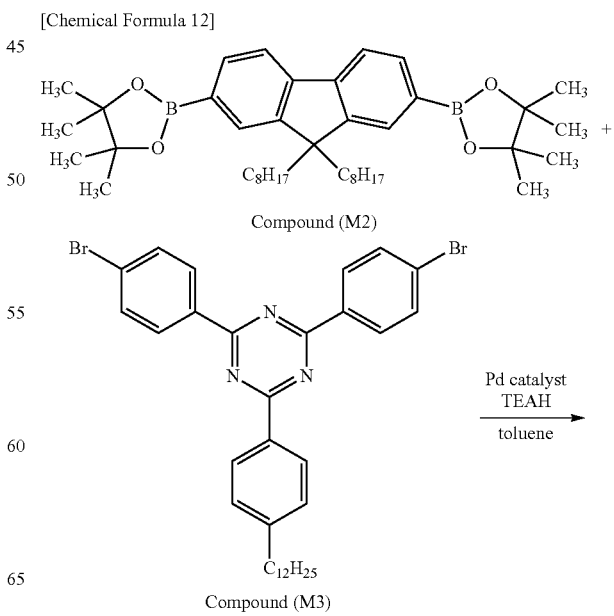

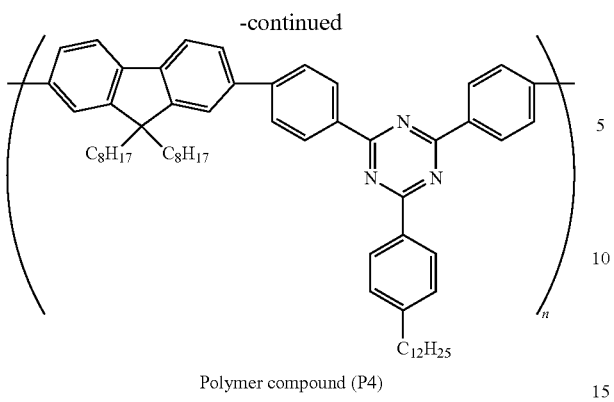

Polymer compound (P4)

(wherein, n represents the number of a repeating unit)

Example 9

A polymer compound (P4) was synthesized by the same manner as in Example 8 except that toluene having a peroxide amount of 2 ppm by weight was used instead of toluene having a peroxide amount of 0.2 ppm by weight in Example 8. The polymer compound (P4) had an Mw of $140 \times 10^3$.

Example 10

A polymer compound (P4) was synthesized by the same manner as in Example 8 except that toluene having a peroxide amount of 15 ppm by weight was used instead of toluene having a peroxide amount of 0.2 ppm by weight in Example 8. The polymer compound (P4) had an Mw of $127 \times 10^3$.

Comparative Example 4

A polymer compound (P4) was synthesized by the same manner as in Example 8 except that toluene having a peroxide amount of 17 ppm by weight was used instead of toluene having a peroxide amount of 0.2 ppm by weight in Example 8. The polymer compound (P4) had an Mw of $108 \times 10^3$.

Comparative Example 5

A polymer compound (P4) was synthesized by the same manner as in Example 8 except that toluene having a peroxide amount of 18 ppm by weight was used instead of toluene having a peroxide amount of 0.2 ppm by weight in Example 8. The polymer compound (P4) had an Mw of $109 \times 10^3$.

Comparative Example 6

A polymer compound (P4) was synthesized by the same manner as in Example 8 except that toluene having a peroxide amount of 20 ppm by weight was used instead of toluene having a peroxide amount of 0.2 ppm by weight in Example 8. The polymer compound (P4) had an Mw of $107 \times 10^3$.

Comparative Example 7

A polymer compound (P4) was synthesized by the same manner as in Example 8 except that toluene having a peroxide amount of 23 ppm by weight was used instead of toluene having a peroxide amount of 0.2 ppm by weight in Example 8. The polymer compound (P4) had an Mw of $104 \times 10^3$.

Comparative Example 8

A polymer compound (P4) was synthesized by the same manner as in Example 8 except that toluene having a peroxide amount of 40 ppm by weight was used instead of toluene having a peroxide amount of 0.2 ppm by weight in Example 8. The polymer compound (P4) had an Mw of $101 \times 10^3$.

TABLE 2

|  | Example | | | Comparative Example | | | | |
| --- | --- | --- | --- | --- | --- | --- | --- | --- |
|  | 8 | 9 | 10 | 4 | 5 | 6 | 7 | 8 |
| Peroxide amount (ppm by weight) | 0.2 | 2 | 15 | 17 | 18 | 20 | 23 | 40 |
| Mw (×10³) | 140 | 140 | 127 | 108 | 109 | 107 | 104 | 101 |

Example 11

An inert gas atmosphere was prepared in a reaction vessel, then, a compound (M2) (0.2033 g, 0.316 mmol), a compound (M4) (0.1284 g, 0.316 mmol), dichlorobis[tris(2-methoxyphenyl)phosphine]palladium (1.39 mg, 0.00158 mmol) and xylene having a peroxide amount of 4 ppm by weight (10 g) were mixed, and heated at 86° C. To the resultant mixture was added a 20% by weight tetraethylammonium hydroxide aqueous solution (1.16 g), and the mixture was mixed by a magnetic stirrer at a revolution speed of a stirring bar of 1000 rpm for 3 hours while heating, to obtain a polymer compound (P5). The polymer compound (P5) had an Mw of $301 \times 10^3$.

[Chemical Formula 13]

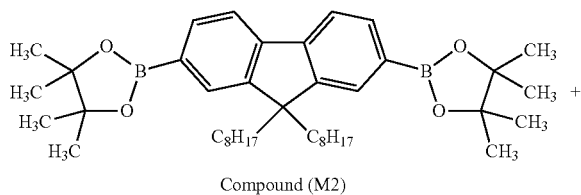

Compound (M2)

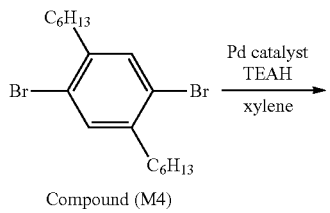

Compound (M4)

-continued

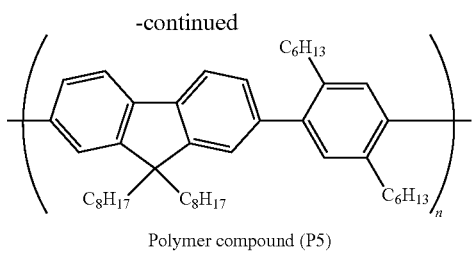
Polymer compound (P5)

(wherein, n represents the number of a repeating unit)

Example 12

A polymer compound (P5) was synthesized by the same manner as in Example 11 except that xylene having a peroxide amount of 8 ppm by weight was used instead of xylene having a peroxide amount of 4 ppm by weight in Example 11. The polymer compound (P5) had an Mw of $297 \times 10^3$.

Example 13

A polymer compound (P5) was synthesized by the same manner as in Example 11 except that xylene having a peroxide amount of 15 ppm by weight was used instead of xylene having a peroxide amount of 4 ppm by weight in Example 11. The polymer compound (P5) had an Mw of $300 \times 10^3$.

Comparative Example 9

A polymer compound (P5) was synthesized by the same manner as in Example 11 except that xylene having a peroxide amount of 17 ppm by weight was used instead of xylene having a peroxide amount of 4 ppm by weight in Example 11. The polymer compound (P5) had an Mw of $253 \times 10^3$.

Comparative Example 10

A polymer compound (P5) was synthesized by the same manner as in Example 11 except that xylene having a peroxide amount of 18 ppm by weight was used instead of xylene having a peroxide amount of 4 ppm by weight in Example 11. The polymer compound (P5) had an Mw of $252 \times 10^3$.

Comparative Example 11

A polymer compound (P5) was synthesized by the same manner as in Example 11 except that xylene having a peroxide amount of 25 ppm by weight was used instead of xylene having a peroxide amount of 4 ppm by weight in Example 11. The polymer compound (P5) had an Mw of $233 \times 10^3$.

Comparative Example 12

A polymer compound (P5) was synthesized by the same manner as in Example 11 except that xylene having a peroxide amount of 40 ppm by weight was used instead of xylene having a peroxide amount of 4 ppm by weight in Example 11. The polymer compound (P5) had an Mw of $236 \times 10^3$.

TABLE 3

|  | Example 11 | Example 12 | Example 13 | Comparative Example 9 | Comparative Example 10 | Comparative Example 11 | Comparative Example 12 |
| --- | --- | --- | --- | --- | --- | --- | --- |
| Peroxide amount (ppm by weight) | 4 | 8 | 15 | 17 | 18 | 25 | 40 |
| Mw ($\times 10^3$) | 301 | 297 | 300 | 253 | 252 | 233 | 236 |

INDUSTRIAL APPLICABILITY

According to the present invention, a polymer compound having sufficiently large molecular weight can be obtained.

The invention claimed is:

1. A production method of a polymer compound having a constitutional unit represented by the formula (3-1) and a constitutional unit represented by the formula (3-2), comprising a reaction step of reacting a compound represented by the formula (1) and a compound represented by the formula (2) in the presence of a transition metal complex, a base, and an organic solvent having a peroxide amount of 15 ppm by weight or less,

wherein:

Ar$^1$ and Ar$^2$ each independently represent a divalent aromatic hydrocarbon group, a divalent heteroaromatic group, a group in which a divalent aromatic hydrocarbon group and a divalent heteroaromatic group are bonded, or a group represented by the formula (4), and these groups optionally have a substituent, X$^1$ represents a chlorine atom, a bromine atom, an iodine atom or —O—S(=O)$_2$R$^{C1}$, R$^{C1}$ represents an alkyl group or an aryl group, and these groups optionally have a substituent, and a plurality of X$^1$ may be the same or different, X$^2$ represents —B(OH)$_2$, a borane residue, a borate ester residue or —BF$_3$T, T represents a lithium atom, a sodium atom, a potassium atom, a rubidium atom or a cesium atom, and a plurality of X$^2$ may be the same or different,

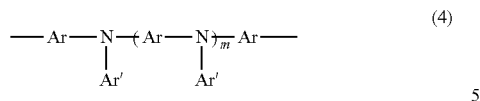
(4)

wherein
- Ar represents a divalent aromatic hydrocarbon group, a divalent heteroaromatic group or a group in which a divalent aromatic hydrocarbon group and a divalent heteroaromatic group are bonded, and these groups optionally have a substituent, and a plurality of Ar may be the same or different,
- Ar' represents an aryl group or a monovalent heteroaromatic group, and these groups optionally have a substituent, and when a plurality of Ar' are present, they may be the same or different,
- m represents an integer of 0 to 2, and
- a radical chain inhibitor is further used in the reaction step.

2. The polymer compound production method according to claim 1, wherein the transition metal complex is a palladium complex.

3. The polymer compound production method according to claim 1, wherein the organic solvent is an organic solvent obtained by contacting the organic solvent with an adsorbent.

* * * * *